(12) United States Patent
Kamata

(10) Patent No.: US 8,896,222 B2
(45) Date of Patent: Nov. 25, 2014

(54) POWER SUPPLY DEVICE AND LUMINAIRE

(75) Inventor: Masahiko Kamata, Yokosuka (JP)

(73) Assignee: Toshiba Lighting & Technology Corporation, Yokosuka-shi, Kanagawa-ken (JP)

(*) Notice: Subject to any disclaimer, the term of this patent is extended or adjusted under 35 U.S.C. 154(b) by 70 days.

(21) Appl. No.: 13/585,925

(22) Filed: Aug. 15, 2012

(65) Prior Publication Data
US 2013/0069550 A1   Mar. 21, 2013

(30) Foreign Application Priority Data
Sep. 21, 2011 (JP) ................ 2011-206294

(51) Int. Cl.
H05B 37/00 (2006.01)
H02J 3/00 (2006.01)
H05B 33/08 (2006.01)

(52) U.S. Cl.
CPC .......... H05B 33/0851 (2013.01); Y02B 20/346 (2013.01); H05B 33/0818 (2013.01)
USPC .......................................... 315/201; 315/192

(58) Field of Classification Search
CPC ...................................................... H05B 37/00
USPC ......... 315/201, 186, 192, 228, 250, 276, 297, 315/307, 313
See application file for complete search history.

(56) References Cited

U.S. PATENT DOCUMENTS 7,982,414 B2   7/2011 Van Erp
8,508,157 B2 * 8/2013 Kim et al. ..................... 315/308
2007/0052375 A1   3/2007 Lin et al.
2008/0012502 A1 * 1/2008 Lys ................. 315/247
2009/0278473 A1   11/2009 Van Erp
2011/0018465 A1   1/2011 Ashdown

FOREIGN PATENT DOCUMENTS

JP   05-082275 A   4/1993
WO   2008/007268 A2   1/2008
WO   2009/090511 A2   7/2009

OTHER PUBLICATIONS

Extended European Search Report for corresponding European Patent Application No. 12181927.0, dated Dec. 18, 2012.

* cited by examiner

Primary Examiner — Daniel D Chang
(74) Attorney, Agent, or Firm — Banner & Witcoff, Ltd.

(57) ABSTRACT

According to one embodiment, a power supply device includes a rectifying circuit configured to rectify an alternating-current power supply and a power-supply-voltage converting section. The power-supply-voltage converting section includes a plurality of power-supply-voltage converting circuits provided between the rectifying circuit and a plurality of output sections to which loads are respectively connected. Switching elements configured to convert a power supply voltage rectified by the rectifying circuit and supply the power supply voltage to the loads are provided in the plurality of power-supply-voltage converting circuits. The switching elements of the plurality of power-supply-voltage converting circuits are set to at least two different switching frequencies and turned on and off with the respective switching frequencies fixed.

14 Claims, 3 Drawing Sheets

US 8,896,222 B2

POWER SUPPLY DEVICE AND LUMINAIRE

INCORPORATION BY REFERENCE

The present invention claims priority under 35 U.S.C. §119 to Japanese Patent Application No. 2011-206294 filed on Sep. 21, 2011. The content of the application is incorporated herein by reference in their entirety.

FIELD

Embodiments described herein relate generally to a power supply device that supplies electric power to loads and a luminaire including the power supply device.

BACKGROUND

In the past, for example, a power supply device including LED elements as loads rectifies an alternating-current power supply with a rectifying circuit, converts a rectified direct-current voltage by turning on and off switching elements of a power-supply-voltage converting circuit, and supplies the direct-current voltage to the LED elements to turn on the LED elements.

It is known that noise superimposed on a power supply voltage according to a switching operation of the switching elements leaks to the alternating-current power supply side and affects other electric appliances connected to the alternating-current power supply. Therefore, a filter circuit for noise prevention for reducing noise is often provided between the alternating-current power supply and the rectifying circuit.

It is proposed to separately provide the rectifying circuit and the power-supply-voltage converting circuit for each of plural lamps and change, at random, switching frequencies for turning on and off the switching elements of at least one power-supply-voltage converting circuits to thereby reduce noise intensity as a whole.

An output of a luminaire including the LED elements has been increased. Electric power converted by the power-supply-voltage converting circuit of the power supply device increases according to the increase in the output. Noise leaking from the power supply device to an alternating-current power supply side also tends to increase.

Therefore, in the case of the filter circuit for noise prevention, unless a large filter circuit for noise prevention is used, a noise prevention effect is insufficient.

When the switching frequencies of the switching elements are changed at random, the circuit including the switching elements is complicated. It is likely that the degree of brightness, which is the output of the luminaire, changes according to the change in the switching frequencies.

Therefore, it is an object of the present invention to provide a power supply device that can reduce, with a simple configuration, noise intensity while keeping an output of loads fixed and a luminaire including the power supply device.

BRIEF DESCRIPTION OF THE DRAWINGS

FIGS. 3(a) and 3(b) are waveform charts of noise superimposed on a power supply voltage of the power supply device, wherein FIG. 3(a) is a waveform chart of noise superimposed on the power supply voltage if frequencies of plural switching elements are different and FIG. 3(b) is a waveform chart of noise superimposed on the power supply voltage if the frequencies of the plural switching elements are the same.

DETAILED DESCRIPTION

In general, according to an embodiment, a power supply device includes a rectifying circuit configured to rectify an alternating-current power supply and a power-supply-voltage converting section. The power-supply-voltage converting section includes a plurality of power-supply-voltage converting circuits provided between the rectifying circuit and a plurality of output sections to which loads are respectively connected. Switching elements configured to convert a power supply voltage rectified by the rectifying circuit and supply the power supply voltage to the loads are provided in the plurality of power-supply-voltage converting circuits. The switching elements of the plurality of power-supply-voltage converting circuits are set to at least two different switching frequencies and turned on and off with the respective switching frequencies fixed.

With this configuration, the power-supply-voltage converting section is divided into the plurality of power-supply-voltage converting circuits to which the loads are respectively connected and in which the switching elements are provided. The switching elements of the plurality of power-supply-voltage converting circuits are set to the at least two different switching frequencies and turned on and off with the respective switching frequencies fixed. Therefore, it can be expected to reduce, with a simple configuration, noise intensity while keeping outputs of the loads fixed.

An embodiment is explained below with reference to the accompanying drawings.

Figure 1:
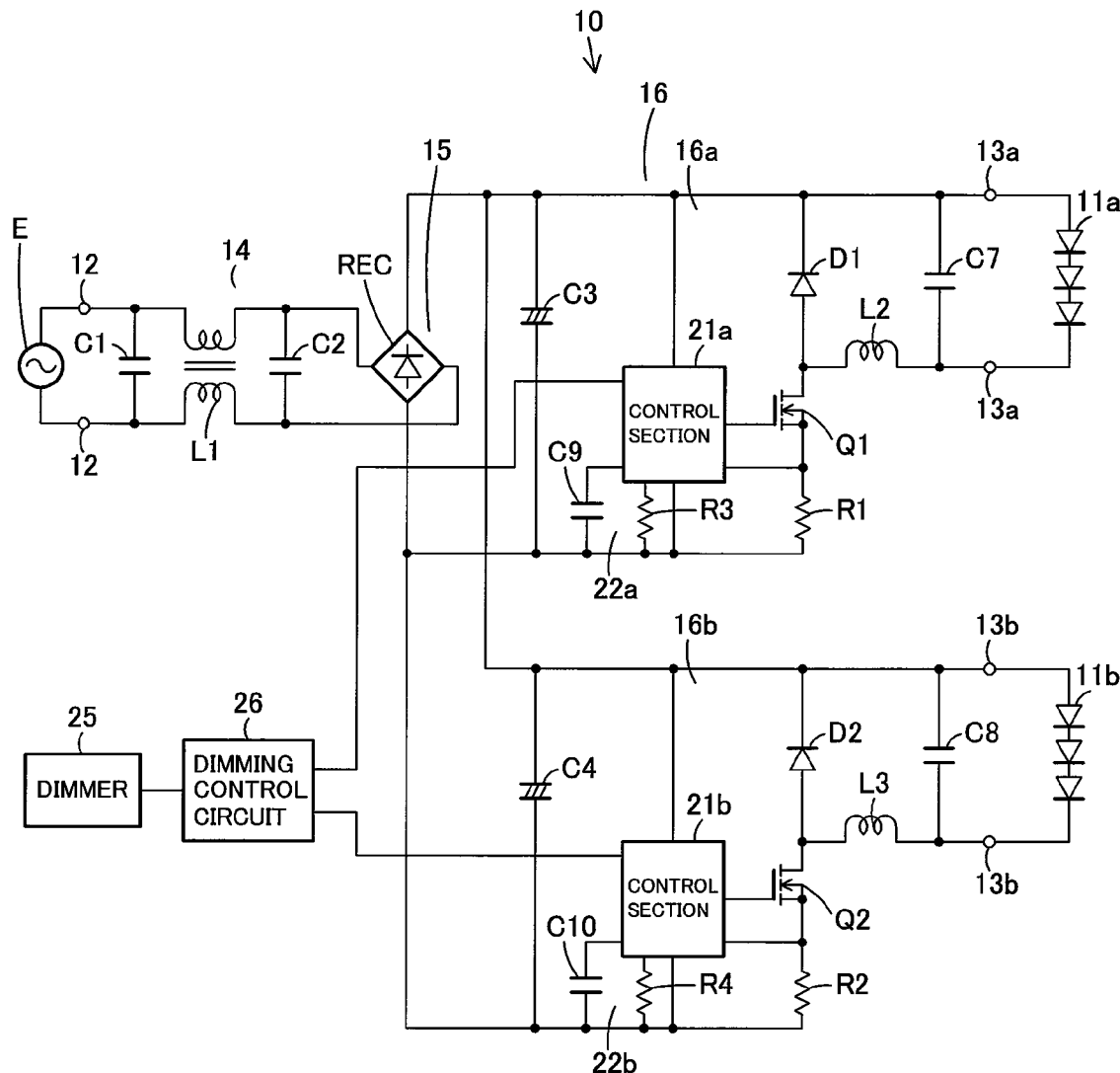
FIG. 1 is a circuit diagram of a power supply device according to an embodiment.

In FIG. 1, a power supply device 10 is connected to an alternating-current power supply E, which is a commercial alternating-current power supply. The power supply device 10 supplies electric power to LED (Light-Emitting Diode) elements 11a and 11b, which are plural divided loads, and turns on the LED elements 11a and 11b. The power supply device 10 can be applied to a luminaire such as a base light or a downlight in which an output of a light beam is increased using a large number of the LED elements 11a and 11b.

The power supply device 10 includes common input sections 12 connected to the alternating-current power supply E, plural output sections 13a and 13b to which the LED elements 11a and 11b are connected, a common filter circuit 14 connected to the input sections 12, a common rectifying circuit 15 connected to the filter circuit 14, and a power-supply-voltage converting section 16 including plural power-supply-voltage converting circuits 16a and 16b connected between an output side of the rectifying circuit 15 and the output sections 13a and 13b.

In this embodiment, the power supply device 10 includes two system each including the LED elements, the output sections, and the power-supply-voltage converting circuit, which are represented as a first LED element 11a and a second LED element 11b, first output sections 13a and second output sections 13b, and a first power-supply-voltage converting circuit 16a and a second power-supply-voltage converting circuit 16b.

The filter circuit 14 includes a capacitor C1, an inductor L1, and a capacitor C2 connected to the pair of input sections 12 in parallel. The filter circuit 14 reduces a noise component input from the alternating-current power supply E side and a noise component output to the alternating-current power supply E side.

A full-wave rectifier REC is used for the rectifying circuit 15. Input ends of the full-wave rectifier REC is connected to output ends of the filter circuit 14. Input ends of the power-supply-voltage converting circuits 16a and 16b are connected to an output ends of the full-wave rectifier REC in parallel.

The power-supply-voltage converting circuits 16a and 16b have a basic configuration in common. The power-supply-voltage converting circuits 16a and 16b include DC-DC converters such as falling voltage chipper circuits that drop a power supply voltage after rectification and output the power supply voltage to the LED elements 11a and 11b Specifically, the power-supply-voltage converting circuits 16a and 16b respectively include smoothing capacitors C3 and C4 connected to the output ends of the full-wave rectifier REC in parallel, series circuits of diodes D1 and D2, switching elements Q1 and Q2 such as MOSFETs, and resistors R1 and R2 connected to both ends of the smoothing capacitors C3 and C4 in parallel, inductors L2 and L3, input ends of which are connected between the diodes D1 and D2 and drains of the switching elements Q1 and Q2, and smoothing capacitors C7 and C8 connected to output ends of the inductors L2 and L3 and connected to the output sections 13a and 13b in parallel.

Control sections 21a and 21b (a first control section 21a and a second control section 21b) are connected in parallel to the smoothing capacitors C3 and C4. Gates of the switching elements Q1 and Q2 and connection points of sources of the switching elements Q1 and Q2 and the resistors R1 and R2 are connected to the control sections 21a and 21b. The control sections 21a and 21b include, for example, ICs. The control sections 21a and 21b turn on and off the switching elements Q1 and Q2 at predetermined switching frequencies according to a signal output to the sources of the switching elements Q1 and Q2. Specifically, the control sections 21a and 21b receive a dimming signal from the outside and subject the switching elements Q1 and Q2 to PWM control. The control sections 21a and 21b are configured to control on-duty ratios of the switching elements Q1 and Q2 to thereby control an electric current flowing to the LED elements 11a and 11b and adjust the degree of brightness of light emission of the LED elements 11a and 11b.

Switching-frequency setting sections 22a and 22b are connected between the control sections 21a and 21b and negative electrodes side of the smoothing capacitors C3 and C4. The switching-frequency setting sections 22a and 22b include capacitors C9 and C10 and resistors R3 and R4. The switching-frequency setting sections 22a and 22b are configured such that switching frequencies are set by the control sections 21a and 21b according to the capacitances of the capacitors C9 and C10 and the resistances of the resistors R3 and R4.

A switching frequency f1 at which the first control section 21a turns on and off the switching element Q1 and a switching frequency f2 at which the second control section 21b turns on and off the switching element Q2 are respectively set to fixed frequencies by the switching-frequency setting sections 22a and 22b. However, the switching frequency f1 and the switching frequency f2 are set to different frequencies, for example, one of which is high and the other of which is lower than the one frequency.

A dimming signal from a dimmer 25 arranged on the outside is input to the control sections 21a and 21b through a dimming control circuit 26.

Figure 2:
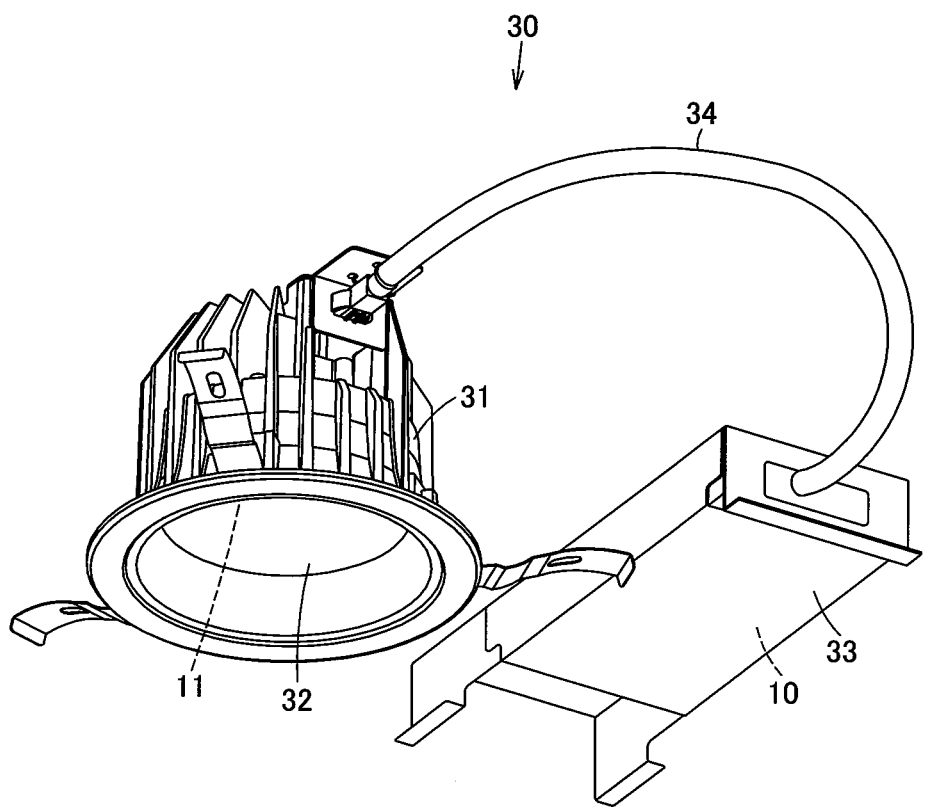
FIG. 2 is a perspective view of a luminaire including the power supply device.

In FIG. 2, a luminaire 30 including the power supply device 10 is shown. The luminaire 30 is an embedded downlight of a high-output type. The luminaire 30 includes a luminaire body 31 provided in a cylindrical shape opened at the bottom. An LED module including the LED elements 11a and 11b is attached in the luminaire body 31. A reflector that controls luminous intensity distribution of lights generated by the LED elements 11a and 11b, a translucent cover 32 that covers the bottom of the reflector, and the like are arranged in the luminaire body 31.

The power supply device 10 is housed in a case 33. The power supply device 10 is set separately from the luminaire body 31. The power supply device 10 is electrically connected to the LED module by a cable 34.

The operation of the power supply device 10 is explained below.

When the alternating-current power supply E is turned on, a power supply voltage rectified by the full-wave rectifier REC through the filter circuit 14 is input to the power-supply-voltage converting circuits 16a and 16b. The power supply voltage input to the power-supply-voltage converting circuits 16a and 16b is smoothed by the smoothing capacitors C3 and C4 and supplied into the power-supply-voltage converting circuits 16a and 16b. The power-supply-voltage converting circuits 16a and 16b are started.

In the started power-supply-voltage converting circuits 16a and 16b, the control sections 21a and 21b respectively turn on and Off the switching elements Q1 and Q2 at switching frequencies set in advance. Consequently, the power supply voltage input to the power-supply-voltage converting circuits 16a and 16b are dropped and supplied to the LED elements 11a and 11b. The LED elements 11a and 11b are turned on.

At this point, the switching frequency f1 at which the first control section 21a turns on and off the switching element Q1 and the switching frequency f2 at which the second control section 21b turns on and off the switching element Q2 are different. However, the respective frequencies are kept fixed.

The filter circuit 14 reduces leakage of noise superimposed on the power supply voltage according to the switching operation of the switching elements Q1 and Q2 to the alternating-current power supply E side. The noise occurs depending on switching frequencies.

Figure 3:
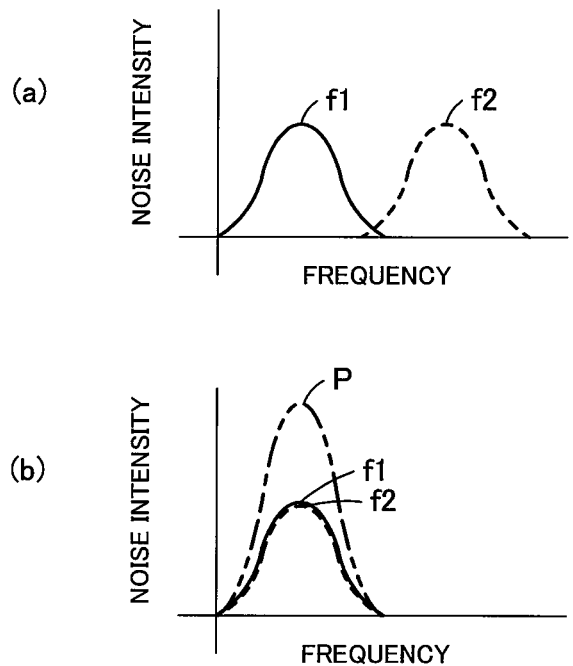

As shown in FIG. 3(b), if it is assumed that the switching frequency f1 and the switching frequency f2 are the same, in some case, noise components overlap and a peak (P) of a noise level increases. In order to reduce, with the filter circuit 14, such noise having the large peak (P) to a sufficiently small noise level not affecting other electric appliances connected to the alternating-current power supply E, it is necessary to use the capacitor C1, the capacitor C2, and the inductor L1 having large capacitances for the filter circuit 14. As a result, it is likely that the filter circuit 14 is increased in size to prevent a reduction in the size of the power supply device 10. The switching frequency f1 and the switching frequency f2 being the same is equivalent to supplying electric power to both the LED elements 11a and 11b with only one power-supply-voltage converting circuit.

On the other hand, as shown in FIG. 3(a), if the switching frequency f1 and the switching frequency f2 are set different, since peaks of the noise components of the respective frequencies are different, it is possible to prevent the noise components from overlapping to cause the peak (P) shown in FIG. 3(b). The filter circuit 14 can reduce such noise having the small peak to the sufficiently small noise level not affecting other electric appliances connected to the alternating-current power supply E.

The dimming signal from the dimmer 25 is input to the control sections 21a and 21b through the dimming control circuit 26 by operating the dimmer 25. The control sections 21a and 21b control, on the basis of the input dimming signal, on-duty ratios of PWM signals output to the switching elements Q1 and Q2. Consequently, the LED elements 11a and 11b are dimmed.

Figure 4:
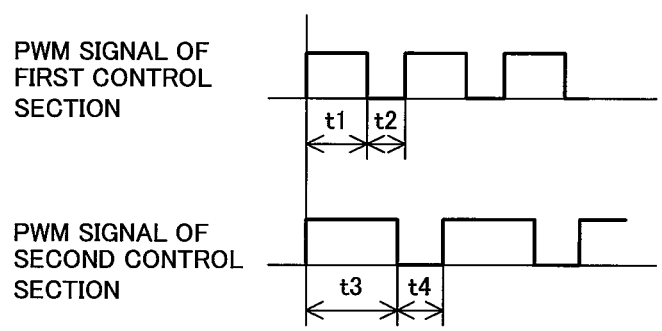
FIG. 4 is a waveform chart of PWM signals output by control sections of the power supply device.

In this case, for example, as shown in FIG. 4, even if a switching frequency of a PWM signal output from the first control section 21a is high and a switching frequency of a PWM signal output from the second control section 21b is low and the frequencies are different, on-duty ratios of the PWM signals are the same. In other words, the PWM signals are in a relation of t1:t2=t3:t4. Consequently, it is possible to subject the LED elements 11a and 11b to dimming control irrespective of the switching frequencies of the switching elements Q1 and Q2.

As explained above, with the power supply device 10 according to this embodiment, the power-supply-voltage converting section 16 is divided into the plural power-supply-voltage converting circuits 16a and 16b to which the LED elements 11a and 11b are respectively connected and in which the switching elements Q1 and Q2 are provided. The switching elements Q1 and Q2 of the plural power-supply-voltage converting circuits 16a and 16b are set to the at least two different switching frequencies and turned on and off with the respective switching frequencies fixed. Therefore, it is possible to reduce, with a simple configuration, noise intensity while keeping the degrees of brightness of the LED elements 11a and 11b fixed.

Further, even if the power-supply-voltage converting section 16 is divided into the plural power-supply-voltage converting circuits 16a and 16b, since the filter circuit 14 and the rectifying circuit 15 are common, it is possible to prevent the configuration of the power supply device 10 from being complicated.

The power supply device 10 includes the switching-frequency setting sections 22a and 22b that set the switching frequencies at which the control sections 21a and 21b turn on and off the switching elements Q1 and Q2. Therefore, the switching elements Q1 and Q2 of the power-supply-voltage converting circuits 16a and 16b can be set to the at least two different switching frequencies and turned on and off with the respective switching frequencies fixed with a simple configuration.

In this embodiment, the LED elements 11a and 11b, the output sections 13a and 13b, and the power-supply-voltage converting circuits 16a and 16b are divided into two systems. However, in the case of a luminaire further increased in output, the LED elements 11a and 11b, the output sections 13a and 13b, and the power-supply-voltage converting circuits 16a and 16b may be divided into three or more sets each.

The loads are not limited to the LED elements 11a and 11b and may be other light sources such as EL (Electro-Luminescence) elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply device comprising:
    a rectifying circuit configured to rectify an alternating-current power supply; and
    a power-supply-voltage converting section including a plurality of power-supply-voltage converting circuits provided between the rectifying circuit and a plurality of output sections to which loads are respectively connected, the plurality of power-supply-voltage converting circuits including switching elements configured to convert a power supply voltage rectified by the rectifying circuit and supply the power supply voltage to the loads, and the switching elements of the plurality of power-supply-voltage converting circuits being set to at least two different switching frequencies for turning on and off the switching elements and being turned on and off with the respective switching frequencies fixed, wherein a first switching element of a first power-supply voltage converting circuit is set to a first switching frequency for turning on and off the first switching element and a second switching element of a second power-supply converting circuit is set to a second switching frequency for turning on and off the second switching element, the first switching frequency being different from the second switching frequency.

2. The device according to claim 1, wherein the plurality of power-supply-voltage converting circuits include:
    control sections configured to turn on and off the switching elements; and
    switching-frequency setting sections configured to set the switching frequencies for turning on and off the switching elements with the control sections.

3. The device according to claim 1, wherein the different switching frequencies are switching frequencies, peaks of noise components of which do not overlap.

4. The device according to claim 1, wherein the plurality of power-supply-voltage converting circuits receive a dimming signal from an external source and control on-duty ratios of the switching elements.

5. The device according to claim 4, wherein, in the plurality of power-supply-voltage converting circuits, even if the switching frequencies are different, the on-duty ratios of the switching elements are the same.

6. The device according to claim 1, wherein the loads are LED elements.

7. The device according to claim 1, wherein the loads are EL elements.

8. A luminaire comprising:
    a luminaire body;
    a power supply device including:
        a rectifying circuit configured to rectify an alternating-current power supply; and
        a power-supply-voltage converting section including a plurality of power-supply-voltage converting circuits provided between the rectifying circuit and a plurality of output sections to which loads are respectively connected, the plurality of power-supply-voltage converting circuits including switching elements configured to convert a power supply voltage rectified by the rectifying circuit and supply the power supply voltage to the loads, and the switching elements of the plurality of power-supply-voltage converting circuits being set to at least two different switching frequencies for turning on and off the switching elements and being turned on and off with the respective switching frequencies fixed, wherein a first switching element of a first power-supply voltage converting circuit is set to a first switching frequency for turning on and off the first switching element and a second switching element of a second power-supply converting circuit is set to a second switching frequency for turning on and off the second switching element, the first switching frequency being different from the second switching frequency; and light sources functioning as the loads.

9. The luminaire according to claim 8, wherein the plurality of power-supply-voltage converting circuits include:
control sections configured to turn on and off the switching elements; and
switching-frequency setting sections configured to set the switching frequencies for turning on and off the switching elements with the control sections.

10. The luminaire according to claim 8, wherein the different switching frequencies are switching frequencies, peaks of noise components of which do not overlap.

11. The luminaire according to claim 8, wherein the plurality of power-supply-voltage converting circuits receive a dimming signal from an external source and control on-duty ratios of the switching elements.

12. The luminaire according to claim 11, wherein, in the plurality of power-supply-voltage converting circuits, even if the switching frequencies are different, the on-duty ratios of the switching elements are the same.

13. The luminaire according to claim 8, wherein the loads are LED elements.

14. The luminaire according to claim 8, wherein the loads are EL elements.

* * * * *